United States Patent [19]

Kachman

[11] 4,142,973
[45] Mar. 6, 1979

[54] VALVE WITH INDICATOR CIRCUIT

[75] Inventor: Robert D. Kachman, Madison Heights, Mich.

[73] Assignee: Facet Enterprises, Inc., Tulsa, Okla.

[21] Appl. No.: 769,647

[22] Filed: Feb. 17, 1977

[51] Int. Cl.² .................. B01D 35/00; F16K 37/00; G08B 21/00
[52] U.S. Cl. .................... 210/90; 210/168; 210/133; 137/554; 340/607
[58] Field of Search .......... 210/DIG. 17, 90, 130, 210/440, 443, 457, 167, 168, 133; 137/544, 554; 340/239 F, 607; 49/13, 14; 200/81.9 R, 264, 265, 262, 275; 252/511

[56] References Cited

U.S. PATENT DOCUMENTS

| | | | |
|---|---|---|---|
| 1,888,762 | 11/1932 | Geer | 252/511 |
| 2,630,228 | 3/1953 | Wright et al. | 210/443 |
| 2,729,339 | 1/1956 | McCoy | 210/90 |
| 2,898,418 | 8/1959 | Byam | 200/83 |
| 3,140,342 | 7/1964 | Ehrreich et al. | 174/35 |
| 3,194,860 | 7/1965 | Ehrreich et al. | 264/154 |
| 3,596,031 | 7/1971 | Murakoshi | 200/166 |
| 3,644,915 | 2/1972 | McBurnett | 210/90 |
| 3,648,002 | 3/1972 | Du Rocher | 200/166 C |
| 3,751,612 | 8/1973 | Hansen | 200/52 R |
| 3,828,812 | 8/1974 | Read | 210/90 |

Primary Examiner—Thomas G. Wyse
Assistant Examiner—David R. Sadowski
Attorney, Agent, or Firm—Remy J. VanOphem

[57] ABSTRACT

A Poppet valve is disclosed of the type in which a valve member located in a flow passage is biased to the closed position on a valve seat, and in which an electrical indication is provided, when the valve seats or unseats, by an indicator circuit which includes a current path through the valve and valve seat which is opened and closed by seating and unseating respectively of the valve. The valve construction includes a conductive rubber seal which insures a positive seal while allowing the passage of electric current for activating the indicator circuit. In one embodiment, a thin metal contact washer is used in conjunction with the rubber seal to enhance its conductivity, the configuration of the contact washer allowing good sealing contact while greatly improving the contact conductivity.

The indicator circuit activates an indicator device such as a panel light in response to the making or breaking of the current path caused by seating or unseating of the valve.

8 Claims, 5 Drawing Figures

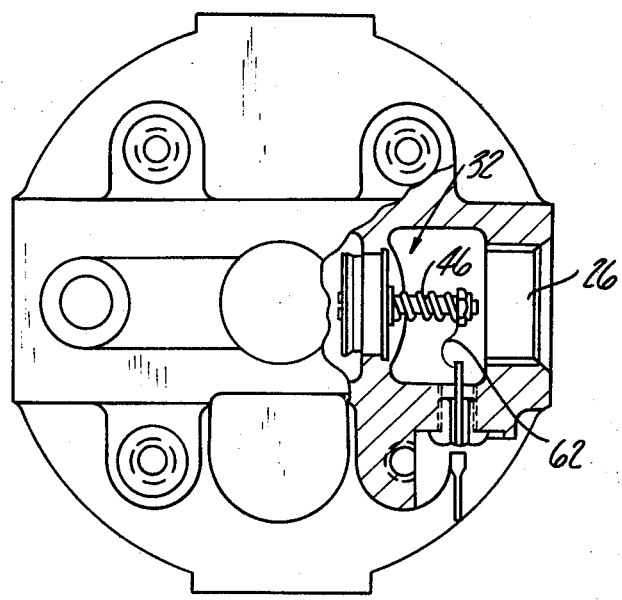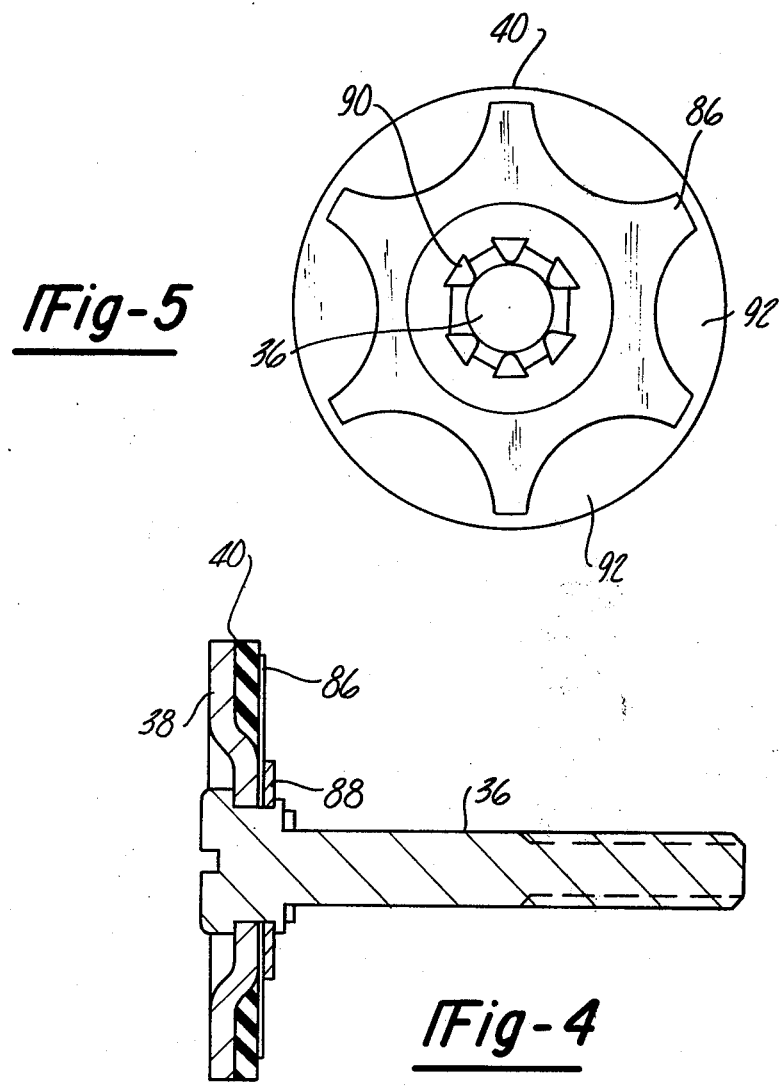

VALVE WITH INDICATOR CIRCUIT

BACKGROUND OF THE INVENTION

1. Field of the Invention

This invention concerns valve operation indicators and more particularly electrically operated valve indicators.

2. Description of the Prior Art

Filtering units of the sort adapted to filtering liquids such as lubricating oil or fuels for engines and other machines typically include a bypass arrangement which provides for flow of the lubricating oil or fuel without going through the filter elements if the filter becomes so clogged as to reduce the flow below safe levels. This bypass arrangement typically includes a poppet or other type valve located in a bypass flow passage and biased so as to be normally closed, with a pressure build up created by a clogged filter causing the valve to open.

It has long been recognized that it would be desirable to provide some means of indicating a bypass flow condition of the filter, since dirty oil or fuel allowed to circulate to the engine greatly therefore increases engine wear. Such means typically took the form of a switch or a probe mechanically operated to control an indicator, but this involved wear of the switch, complicated adjustments to reset the switch as well as maintenance problems.

To avoid such problems it has heretofore been proposed to provide appropriate connections so as to convert the valve itself and cause it to perform the function of a switch in an indicator circuit in which a current flow path is formed through the valve and the valve seat. Such an arrangement is shown in U.S. Pat. No. 3,644,915.

However, such an arrangement includes a metal-to-metal seal between the valve and valve seat, in order to insure sufficient conductivity to operate the indicator circuit, which is expensive to manufacture and is not entirely reliable since proper seating may not occur.

It is, therefore, an object of the present invention to provide an integral valve switch in which positive sealing of the valve is achieved while the valve construction is kept simple and economical to produce.

It is a further object of this invention to provide a filter bypass valve switch which permits the use of a rubber valve body or seat, yet at the same time provide a path for conducting current flow through the bypass valve switch when the valve is closed.

SUMMARY OF THE INVENTION

This and other objects which will become apparent upon a reading of the following specification and claims by providing a valve construction with a conductive rubber seal disposed to engage the valve seat to provide a positive seal. Indicator circuitry is provided in which the conductive rubber seal forms a current flow path when the valve is seated, with an indicator device operated by the circuit and responsive to the making and breaking of the current flow path. In one embodiment, a metal contact washer is provided in combination with the conductive rubber seal to increase the contact conductivity in the area of engagement between the valve seat and the valve, which contact washer is of a configuration which does not interfere with seating of the valve.

DESCRIPTION OF THE DRAWINGS

FIG. 3 is a top view of the filter assembly shown in FIGS. 1 and 2.

FIG. 4 is a sectional view of a poppet valve member according to an alternate embodiment of the present invention.

FIG. 5 is an end view of the poppet valve shown in FIG. 4.

DETAILED DESCRIPTION

Figures 1, 2:
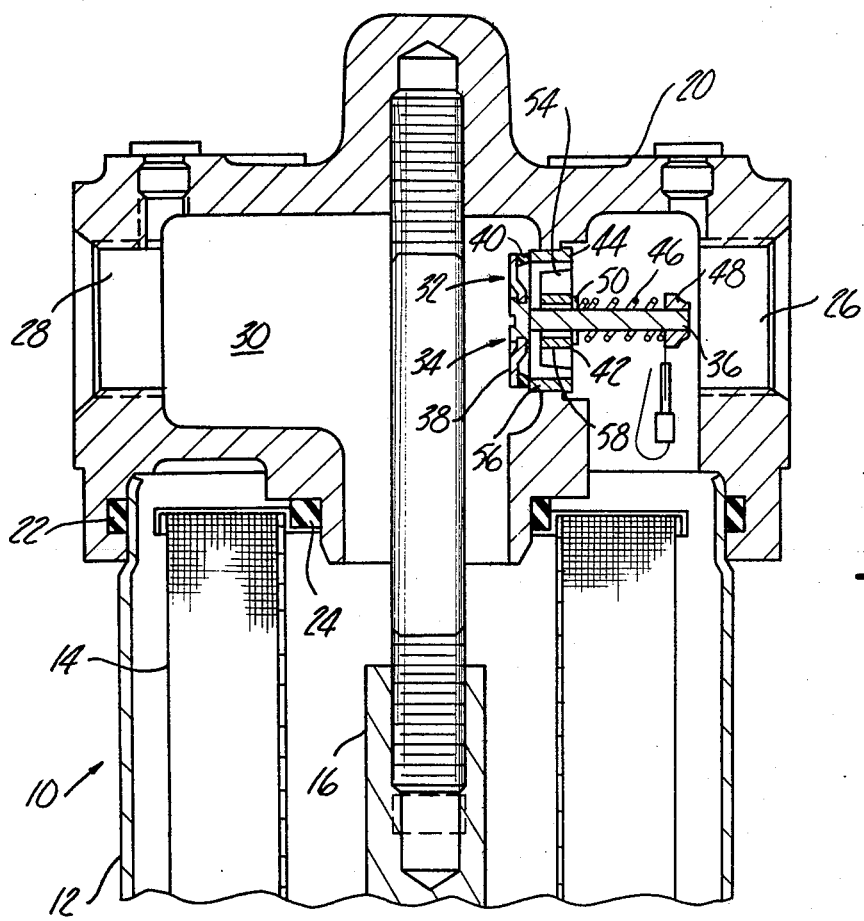
FIG. 1 is a view of a filter assembly (in longitudinal section) incorporating a bypass valve assembly according to the present invention.
FIG. 2 is a fragmentary view in partial section of a portion of the filter assembly shown in FIG. 1.

In the following specification certain specific terminology will be utilized for the sake of clarity, and a particular embodiment described in accordance with the requirements of 35 U.S.C. 112, but it is to be understood that the same is not intended to be limiting, inasmuch as the invention is capable of many variations within the scope of the appended claims.

Referring to the drawings, and particularly FIGS. 1-3, a filter assembly 10 is shown which includes a filter bowl 12 containing a filter element 14 retained on a post assembly 16 by a cap and seal 18. The filter head 20 closes, with seals 22 and 24. The other end of the bowl 12 and filter element 14 and has an inlet passage 26 and an outlet passage 28 formed therein so as to define a flow path around and through the filter element 14 through cavity 30 to the outlet in the conventional manner.

In order to provide the bypass capability, a bypass valve assembly 32 is provided controlling direct communication between the inlet 26 and the cavity 30, by-passing filter element 14.

The bypass valve assembly 32 includes a poppet valve assembly 34 comprised of a valve stem 36 and washer 38 to which is molded a pliable rubber seal 40 having a composition so as to be electrically conductive, as will be described herein in further detail. The valve stem 36 is slidably supported in an electrically insulating bushing 42 carried by a valve housing 44. The valve stem 36 carries a compression spring 46 which engages a retainer nut 48 threaded to one end of the valve stem 36 and a flange 50 formed on the bushing 42 so as to urge the washer 38 and rubber seal 40 into engagement with a valve seat 52 to prevent bypass flow through openings 54 intermediate an outer wall 56 of valve housing 44 and a hub 58 carrying the bushing 42.

The valve housing 44 is press fitted into a bore 60 in cap 20.

An electrical lead 62 is attached to the end of the valve stem 36 which extends through a sealing bushing 64 and terminates in a terminal 66 provided to enable connection to the indicator circuitry indicated in block diagram form in FIG. 2.

According to the present invention, a current flow path is defined by the valve stem 36, the washer 38, rubber seal 40, the valve housing 44 and the filter head 20, to a circuit ground so that the filter head 20 is grounded to the vehicle chassis.

The indicator circuitry may be appropriately responsive to either seating or unseating of the poppet valve assembly 34, that is to the making or breaking of the current flow valve, indicating either a seated or unseated condition thereof.

Since the rubber seal 40 forms a part of the current flow path, it must be rendered sufficiently conductive to enable functioning of the indicator circuit. It has been found that the addition of carbon black to a buna-N rubber elastomer raises the conductivity of the material to the point where a reliable current flow path is created through the rubber seal 40.

From an examination of FIG. 1, it can be seen that the area of the rubber seal 40 in engagement with the valve seat 52 is only a fraction of the area of the rubber seal 40, reducing the conductivity in the contact area. In lower voltage systems (i.e., 12v) the conductivity may be inadequate to reliably operate the indicator circuitry, and in this instance, according to the present invention a contact washer 86 may be provided as shown in FIGS. 4 and 5, secured to the valve stem 36 by means of a retention washer 88 staked at 90 so as to force the contact washer 86 into engagement with the rubber seal 40.

The contact washer is of thin shim stock on the order of 0.002 inches stainless steel, and is relieved by arcuate cut-outs 92 to be star-shaped so as to be quite compliant in the area of contact with the valve seat 52 and not appreciably interfere with the sealing action of the rubber seal 40 on the valve seat 52.

At the same time the conductivity of the assembly is substantially improved, allowing use of the inventive arrangement in low voltage systems.

It can be appreciated that the arrangement described accomplishes the object of the present invention without involving complex structure, requiring extensive maintenance, etc., while reliably providing the indication function.

What is claimed is:

1. A valve operation indicator arrangement comprising:
   a valve;
   a valve housing including a valve seat;
   means movably mounting said valve to seat and unseat on said valve seat and thereby provide a valving function;
   a pliable electrically conductive rubber seal member interposed said valve and said valve housing and adapted to seal the contact area between said valve and valve seat;
   a thin compliant metal contact washer interposed said pliable seal member and the contact area between said valve and said valve seat created by said movement of said valve whereby the conductivity of said current flow path in the region of said contact area is enhanced; and,
   indicator circuit means responsive to the making or breaking of a circuit flow path through said valve, valve seat, and pliable seal member, said indicator circuit means also including means activating an indicator signal upon making or breaking of said current flow path by seating or unseating of said valve from said valve seat to provide an indication of said valve operation.

2. The indicator arrangement according to claim 1 wherein said rubber contains a sufficient proportion of carbon to render the seal substantially conductive.

3. The indicator arrangement according to claim 1 wherein said contact washer is formed with cut-outs in the region of said contact area to further render compliant said contact washer to seating engagement between said valve and said valve seat.

4. The indicator arrangement according to claim 1 wherein said valve is a poppet valve including a valve stem, and wherein said means mounting said valve includes an electrically insulating bushing member slidably receiving said valve stem and carried by said valve housing.

5. A filter assembly comprising:
   a filter bowl;
   a filter element disposed in said filter bowl;
   means defining a filter inlet passage and a filter outlet passage, and means creating a flow path therebetween through said filter element;
   bypass means including a bypass valve adapted to provide a direct bypass flow path between said inlet and outlet without passing through said filter element, said bypass valve including:
   a valve;
   a valve housing including a valve seat;
   means movably mounting said valve to seat and unseat on said valve seat and thereby provide a valving function;
   a pliable electrically conductive rubber seal member interposed said valve and said valve housing and adapted to seal the contact area between said valve member and valve seat;
   a thin compliant metal contact washer interposed between said pliable seal member and the contact area between said valve and said seat created by said movement of said valve whereby the conductivity of said current flow path in the region of said contact area is enhanced; and,
   indicator circuit means including a current flow path through said valve, valve seat, said pliable seal member, said indicator means also including means activating an indicator signal upon making or breaking of said current flow path by seating or unseating of said valve from said valve seat whereby an indication of said valve operation is provided.

6. The filter according to claim 5 wherein said rubber contains sufficient carbon to render the seal substantially conductive.

7. The filter according to claim 5 wherein said contact washer is formed with cut-outs in the region of said contact area to further render compliant said contact washer to seating engagement between said valve and said valve seat.

8. The filter according to claim 5 wherein said valve is a poppet valve including a valve stem, and wherein said means mounting said valve includes an electrically insulating bushing member slidably receiving said valve stem and carried by said valve housing.

* * * * *

UNITED STATES PATENT AND TRADEMARK OFFICE
CERTIFICATE OF CORRECTION

PATENT NO. : 4,142,973
DATED : March 6, 1979
INVENTOR(S) : Robert D. Kachman

It is certified that error appears in the above-identified patent and that said Letters Patent are hereby corrected as shown below:

Column 1, line 24 delete the word "therefore".

Column 2, line 20 following the word "closes" delete the ",".

Column 2, line 29 following the number 24 delete ". The" and insert therefore ----, the----.

Signed and Sealed this

Fourth Day of December 1979

[SEAL]

Attest:

SIDNEY A. DIAMOND

Attesting Officer    Commissioner of Patents and Trademarks